(12) United States Patent
Lacasse-Jobin et al.

(10) Patent No.: US 10,336,387 B2
(45) Date of Patent: Jul. 2, 2019

(54) PASSENGER SEAT FOR A VEHICLE

(71) Applicant: BOMBARDIER RECREATIONAL PRODUCTS INC., Valcourt (CA)

(72) Inventors: Pierre Lacasse-Jobin, Magog (CA); Mark Hebert, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 196 days.

(21) Appl. No.: 15/513,767

(22) PCT Filed: Sep. 23, 2015

(86) PCT No.: PCT/IB2015/057346
§ 371 (c)(1),
(2) Date: Mar. 23, 2017

(87) PCT Pub. No.: WO2016/046775
PCT Pub. Date: Mar. 31, 2016

(65) Prior Publication Data
US 2017/0247073 A1 Aug. 31, 2017

Related U.S. Application Data

(60) Provisional application No. 62/054,265, filed on Sep. 23, 2014.

(51) Int. Cl.
*B62J 1/28* (2006.01)
*B60N 2/00* (2006.01)
(Continued)

(52) U.S. Cl.
CPC ............... *B62J 1/28* (2013.01); *B60N 2/002* (2013.01); *B60R 21/01524* (2014.10);
(Continued)

(58) Field of Classification Search
CPC ........... B60R 21/015; B60R 21/01512; B60R 21/01516; B60R 21/01524; B62J 2099/002; B62J 1/28; B60N 2/002
(Continued)

(56) References Cited

U.S. PATENT DOCUMENTS 2,606,626 A   8/1952  Meyer
2,911,053 A  11/1959  Ayers et al.
(Continued)

FOREIGN PATENT DOCUMENTS

CN   102815242 A   12/2012
DE    19846352 A1    4/1999
(Continued)

OTHER PUBLICATIONS

Supplementary European Search Report No. 15845400; Berlin; dated Mar. 27, 2018; Wauters, Jan.
(Continued)

*Primary Examiner* — Ruth Ilan
(74) *Attorney, Agent, or Firm* — BCF LLP

(57) ABSTRACT

A vehicle includes a frame, a passenger presence sensor mounted thereto, and a seat assembly removably connected to. The seat assembly includes a driver seat disposed on the frame and a passenger seat disposed on the frame rearward of the 5 driver seat, at least the passenger seat being selectively disposed on the frame. A rigid passenger presence responsive member (PPRM) is retained in the passenger seat and movable with respect to the frame between at least a first position and a second position responsive to a weight of a passenger seated on the passenger seat. The PPRM is coupled to the passenger presence sensor in at least one of the first and 10 second positions, the passenger
(Continued)

presence sensor is thereby configured to detect a presence of the passenger. Removable passenger seats for a vehicle are also disclosed.

20 Claims, 16 Drawing Sheets

(51) Int. Cl.
    *B62J 99/00*     (2009.01)
    *B62K 5/027*     (2013.01)
    *G01D 5/14*     (2006.01)
    *B60R 21/015*     (2006.01)

(52) U.S. Cl.
    CPC ............... *B62J 99/00* (2013.01); *B62K 5/027* (2013.01); *G01D 5/145* (2013.01); *B62J 2099/002* (2013.01)

(58) Field of Classification Search
    USPC ........................................ 180/273; 297/217.3
    See application file for complete search history.

(56) References Cited

U.S. PATENT DOCUMENTS

| | | | |
|---|---|---|---|
| 3,414,074 A | 12/1968 | Dannettell | |
| 3,507,350 A | 4/1970 | Boyajian | |
| 3,807,343 A | 4/1974 | Peebles | |
| 4,270,716 A | 6/1981 | Anderson | |
| 4,458,115 A | 7/1984 | Peterson | |
| 4,743,213 A | 5/1988 | Nishida | |
| 4,941,854 A | 7/1990 | Takahashi et al. | |
| 5,397,890 A | 3/1995 | Schueler et al. | |
| 6,086,168 A | 7/2000 | Rump | |
| 6,263,261 B1 | 7/2001 | Brown et al. | |
| 6,324,446 B1 | 7/2001 | Brown et al. | |
| 6,324,447 B1 | 11/2001 | Schramm et al. | |
| 6,338,012 B2 | 1/2002 | Brown et al. | |
| 6,409,286 B1 | 6/2002 | Fennel | |
| 6,446,024 B1 | 9/2002 | Leimbach et al. | |
| 6,450,845 B1 | 9/2002 | Snyder et al. | |
| 6,465,907 B2 | 10/2002 | Ueno et al. | |
| 6,643,573 B2 | 11/2003 | Dickinson et al. | |
| 6,745,112 B2 | 6/2004 | Mori | |
| 6,772,061 B1 | 8/2004 | Berthiaume et al. | |
| 6,820,896 B1* | 11/2004 | Norton ............... | G01G 19/4142 177/141 |
| 6,876,917 B1 | 4/2005 | Bates, Jr. et al. | |
| 6,951,203 B2 | 10/2005 | Spaulding | |
| 7,068,178 B2 | 6/2006 | Oh | |
| 7,350,787 B2 | 4/2008 | Voss | |
| 7,480,547 B2 | 1/2009 | Brown et al. | |
| 7,523,803 B2 | 4/2009 | Breed | |
| 8,260,535 B2 | 9/2012 | Dagenais | |
| 2002/0180166 A1 | 12/2002 | Voss | |
| 2003/0102694 A1 | 6/2003 | Rondeau et al. | |
| 2003/0220766 A1 | 11/2003 | Saunders et al. | |
| 2004/0066023 A1 | 4/2004 | Joseph | |
| 2004/0262957 A1 | 12/2004 | Young et al. | |
| 2005/0150705 A1 | 7/2005 | Vincent et al. | |
| 2005/0284669 A1 | 12/2005 | DiPaola et al. | |
| 2006/0180372 A1 | 8/2006 | Mercier et al. | |
| 2008/0129026 A1 | 6/2008 | Gray et al. | |
| 2008/0272560 A1 | 11/2008 | Voss | |
| 2009/0084623 A1 | 4/2009 | Dagenais | |
| 2012/0234620 A1* | 9/2012 | Boyarski ............... | B60K 28/04 180/273 |
| 2012/0028391 A1 | 11/2012 | Dagenais | |

FOREIGN PATENT DOCUMENTS

| | | |
|---|---|---|
| DE | 102006012246 A1 | 3/2007 |
| DE | 102006049641 A1 | 4/2008 |
| EP | 2055617 A1 | 5/2009 |
| EP | 2444305 A2 | 4/2012 |
| GB | 2334360 A | 8/1999 |
| JP | 11180274 | 7/1999 |
| WO | 03058359 A1 | 7/2003 |
| WO | 2006097498 A1 | 9/2006 |
| WO | 2007130043 A1 | 11/2007 |

OTHER PUBLICATIONS

English Abstract of JP11180274, Published Jul. 6, 1999; Retrieved from the Internet: http://www19.ipdl.inpit.go.jp/PA1/cgi-bin/PA1DETAIL on Jun. 6, 2013.
English Abstract of DE102006012246, Published Mar. 15, 2007; Retrieved from the Internet: http://v3.espacenet.com on Nov. 11, 2008.
English Abstract of DE19846352, Published Apr. 22, 1999; Retrieved from the Internet: http://v3.espacenet.com on Nov. 11, 2008.
International Search Report of PCT/IB2015/057346 dated Jan. 14, 2016.
English Abstract of CN102815242; Retrieved on Oct. 10, 2018; Retrieved from www.worldwide.espacenet.com.
English Abstract of DE102006049641; Retrieved on Oct. 10, 2018; Retrieved from www.worldwide.espacenet.com.

* cited by examiner

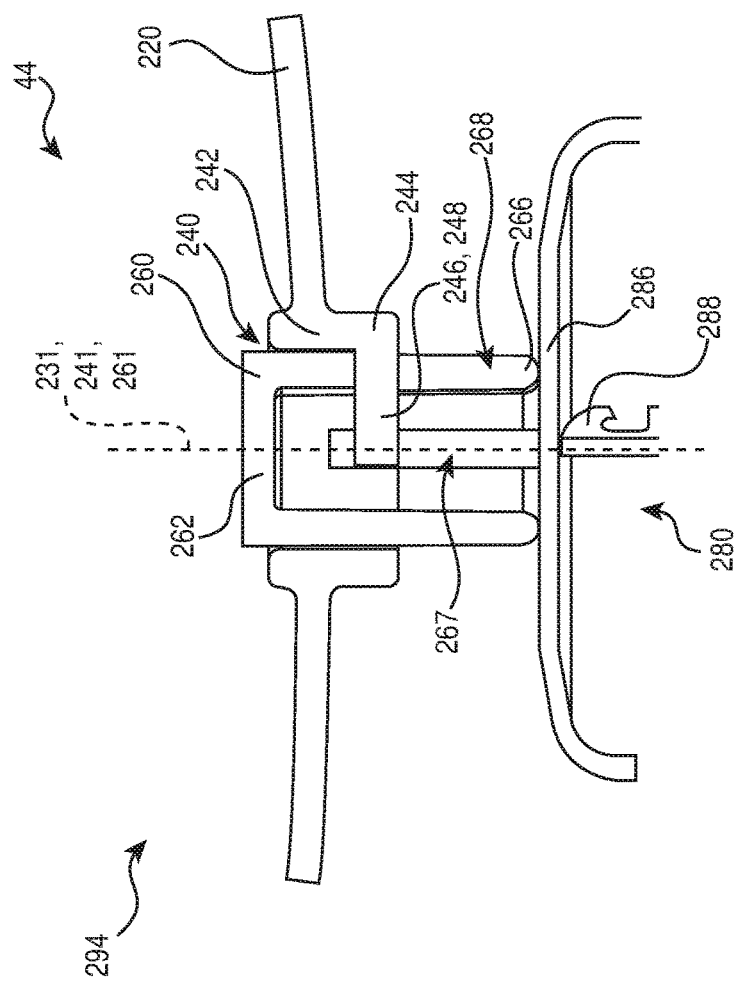

PASSENGER SEAT FOR A VEHICLE

CROSS-REFERENCE

The present application claims priority to U.S. Provisional Patent Application No. 62/054,265 filed on Sep. 23, 2014, the entirety of which is incorporated herein by reference.

FIELD OF THE TECHNOLOGY

The present technology relates to passenger seats for vehicles.

BACKGROUND

Some wheeled straddle-seat vehicles are provided with an electronic control system that allows the vehicle to be operated in different configurations based on factors such as a rotational speed of the engine, a throttle operator position, a pressure in the brake system, the presence or absence of a passenger, and the like. In order to be able to change the operation of the vehicle based on the presence or absence of a passenger, vehicle seats are provided with a passenger seat sensor mounted in the passenger seat for detecting the presence of a passenger. In wheeled straddle-seat vehicles, the seats are often removably attached to the vehicle frame in order to allow access to components disposed under the seat and to allow for replacement. Seats for wheeled straddle-seat vehicles are also often sold separately as an after-market component that can be customized according to the preferences of the particular user (driver and/or passenger).

It is therefore desirable to have a seat for a vehicle having an effective system for detecting the presence or absence of a passenger while permitting removal and replacement of the seat.

SUMMARY

It is an object of the present technology to ameliorate at least some of the inconveniences mentioned above.

In accordance with one aspect of the present technology, there is provided a vehicle including a frame, a passenger presence sensor mounted to the frame, and a seat assembly being removably connected to the frame. The seat assembly includes a driver seat disposed on the frame and a passenger seat disposed the frame rearward of the driver seat. At least the passenger seat is selectively disposed on the frame. A rigid passenger presence responsive member (PPRM) is retained in the passenger seat and movable with respect to the frame between at least a first position and a second position responsive to a weight of a passenger seated on the passenger seat. The PPRM is coupled to the passenger presence sensor in at least one of the first and second positions, the passenger presence sensor being thereby configured to detect a presence of the passenger.

In some implementations, the PPRM is coupled to the passenger position sensor in the first position and the second position.

In some implementations, the passenger sensor is disposed on the frame below the passenger seat.

In some implementations, the vehicle further includes a control unit communicatively coupled to the passenger presence sensor and configured to receive a signal therefrom indicative of a position of the PPRM. The control unit is configured to control an operation of the vehicle based on the signal.

In some implementations, the passenger seat includes a passenger seat base, a passenger seat cushion and the PPRM. The passenger seat base is rigid and removably connected to the frame. The passenger seat cushion is connected to the passenger seat base and disposed thereahove when the passenger seat is disposed on the frame. The passenger seat cushion is resiliently compressible responsive to the weight of the passenger seated thereon. The PPRM is movable responsive to the compression of the passenger seat cushion.

In some implementations, the passenger seat cushion includes an upper surface, a lower surface disposed opposite the upper surface and facing the seat base, and a recess extending from the lower surface towards the upper surface. The PPRM is disposed at least partly in the recess.

In some implementations, the passenger seat base includes a passenger seat base opening extending therethrough. The passenger seat base opening is aligned with the passenger presence sensor and the PPRM. At least a portion of at least one of the PPRM and the passenger presence sensor is disposed in the passenger seat base opening, In some implementations, the passenger seat cushion includes an upper surface, a lower surface opposite the upper surface and facing the seat base, and a recess extending from the lower surface towards the upper surface. The recess is aligned with the seat base opening. The PPRM is disposed at least partly in the recess.

In some implementations, a portion of the PPRM extends through the passenger seat base opening.

In some implementations, the seat base further includes at least one projection extending into the opening to prevent the PPRM from moving out of the passenger seat through the passenger seat base opening. The PPRM is thereby retained in the passenger seat.

In some implementations, the projection engages the PPRM to prevent rotation of the PPRM.

In some implementations, the projection is T-shaped and the PPRM comprises a T-shaped slot complementary to the projection. The projection is received in the slot to thereby engage the PPRM, In some implementations, the PPRM is a cylindrical member.

In some implementations, the passenger presence sensor is a Hall effect sensor.

In some implementations, the Hall effectsensor is disposed on the frame below the passenger seat, a portion of the Hall effect sensor being in contact with the PPRM in the first and second positions and being moveable with the PPRM with respect to the frame. The PPRM is disposed in the first position responsive to a first force on the PPRM. The PPRM is disposed in the second position responsive to a second force on the PPRM, The Hall effect sensor detecting one of the first and second positions of the PPRM and thereby detecting a corresponding one of the first and second forces on the PPRM.

In some implementations, the PPRM is disposed in the first position an absence of the passenger seated on the passenger seat.

In some implementations, when the passenger is seated on the passenger seat, the PPRM is disposed in the second position.

In some implementations, the second position includes a plurality of passenger present positions, each of the plurality of passenger present positions being indicative of a corresponding passenger weight of a plurality of passenger weights. The Hall effect sensor thereby detects the corresponding one of the plurality of passenger weights.

In some implementations, the PPRM is disposed in the first position responsive to a first passenger weight of a plurality of passenger weights, and the PPRM is disposed in the second position responsive to a second passenger weight of the plurality of passenger weights. The Hall effect sensor is thereby configured to detect one of the first passenger weight and second. passenger weight of the plurality of passenger weights.

In some implementations, the PPRM is movable to a third position responsive to a third force on the PPRM, the third position being indicative of an inoperative condition of the passenger seat.

In accordance with another aspect of the present technology, there is provided a removable passenger seat assembly for a vehicle including a passenger seat being adapted to be disposed on a frame of the vehicle rearward of a driver seat thereof, the passenger seat being adapted to be removably connected to the frame, and arigid passenger presence responsive member (PPRM) retained in the passenger seat. The PPRM is movable, with respect to the frame when the passenger seat is disposed on the frame, between at least a first position and a second position responsive to a weight of a passenger seated on the passenger seat. The PPRM is adapted to actuate a passenger presence sensor mounted to the frame, the passenger presence sensor thereby detecting a presence of the passenger.

For the purpose of this application, terms related to spatial orientation such as downward, rearward, forward, front, rear, left, right, above and below are as they would normally be understood by a driver of the vehicle sitting thereon in an upright position with the vehicle in a straight ahead orientation (i.e. not steered left or right), and in an upright position not tilted), Definitions provided herein take precedence over definitions provided on document incorporated herein by reference.

Implementations of the present technology each have at least one of the above-mentioned object and/or aspects, but do not necessarily have all of them. It should he understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 15C is an enlarged cross-sectional view of the passenger seat and portion of the frame of FIG. 15A, with the passenger seat being shown disposed in a passenger seat inoperative condition configuration.

DETAILED DESCRIPTION

The present technology is being described with respect to a three-wheel straddle-type vehicle 10. However, it is contemplated that the present technology could be used on other types of vehicles such as, for example, motorcycles, three- or four-wheel all-terrain vehicles, snowmobiles, and personal watercraft.

Figure 1:
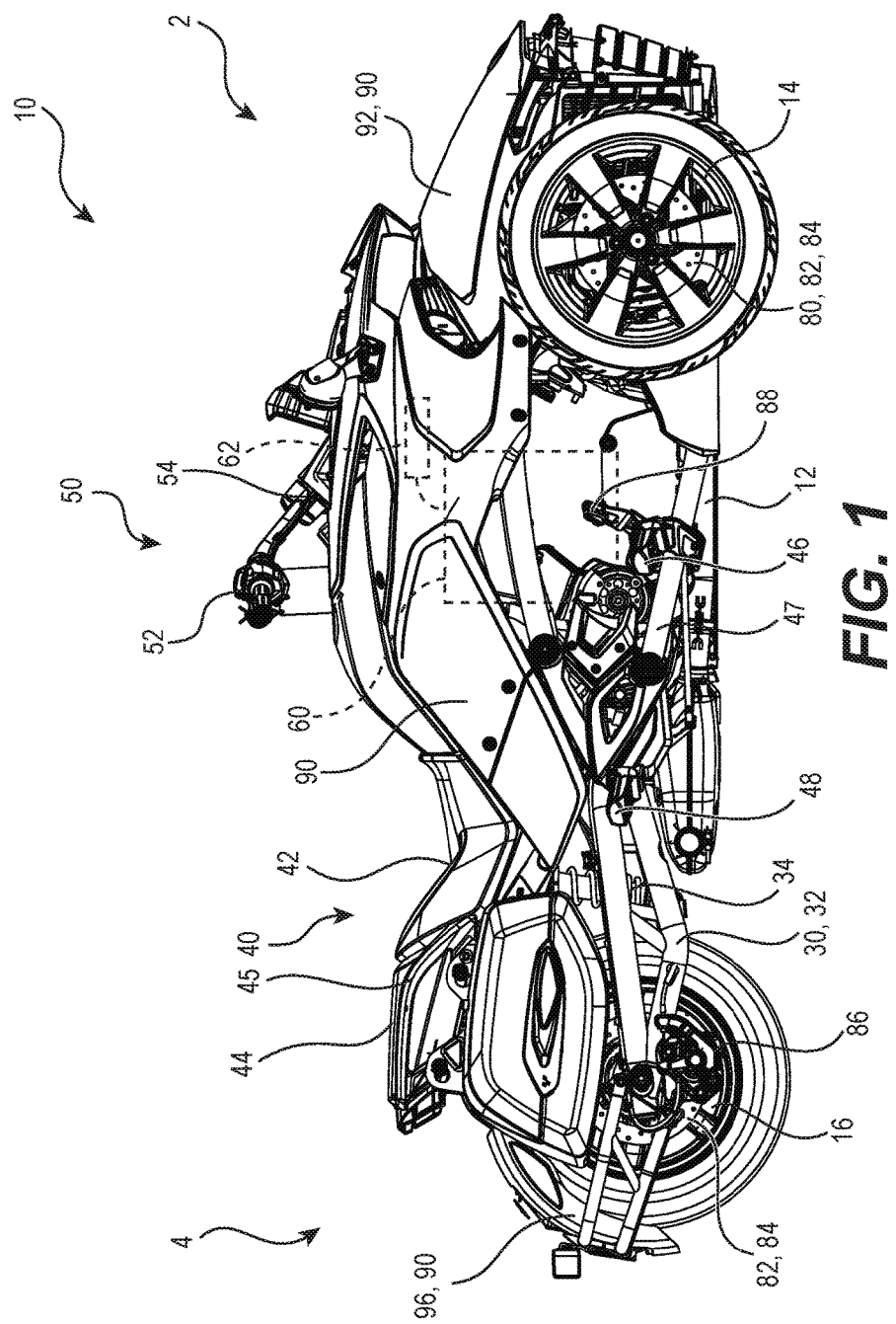
FIG. 1 is a right side elevation view of a three-wheel straddle-type vehicle.
Figure 3:
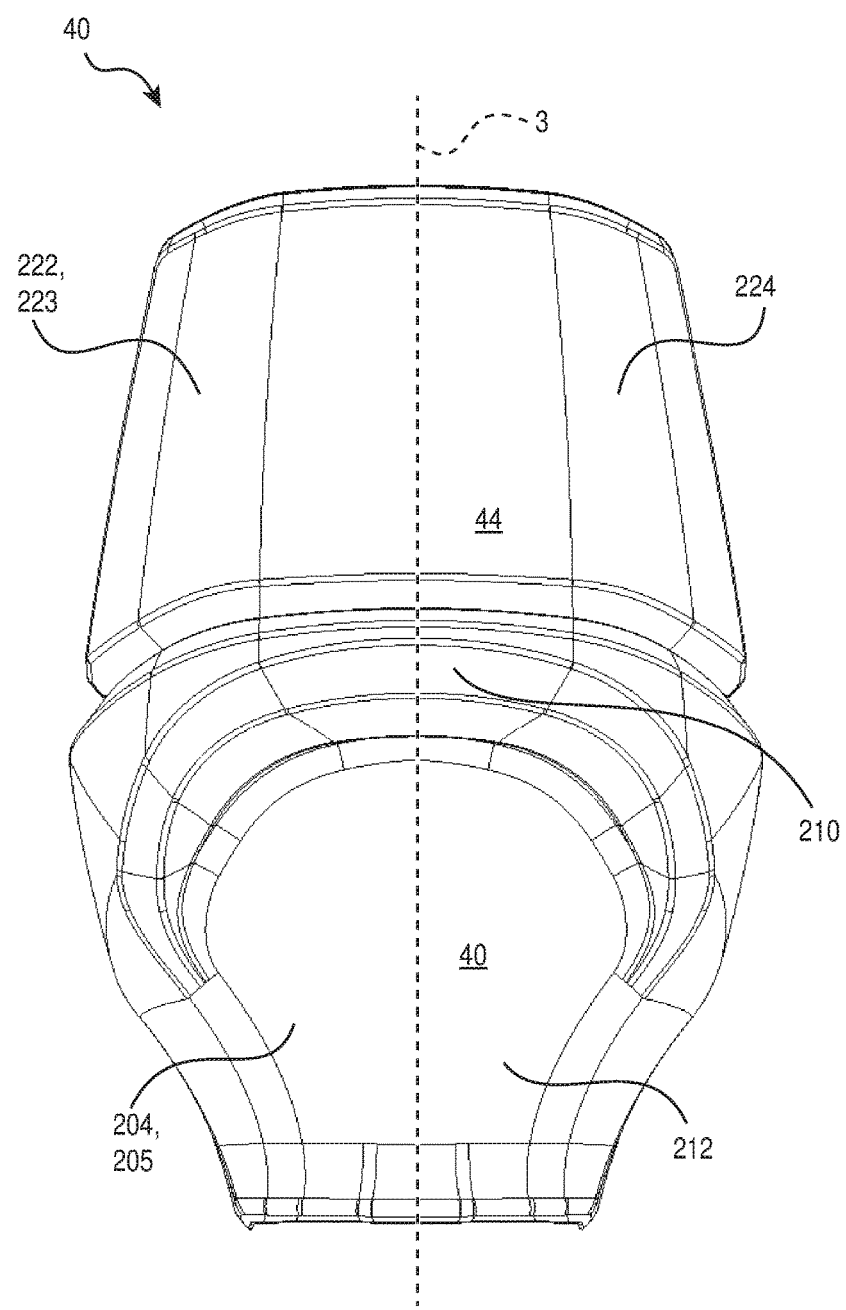
FIG. 3 is a top plan view of the seat assembly of FIG. 2 handles removed for clarity.
Figure 4:
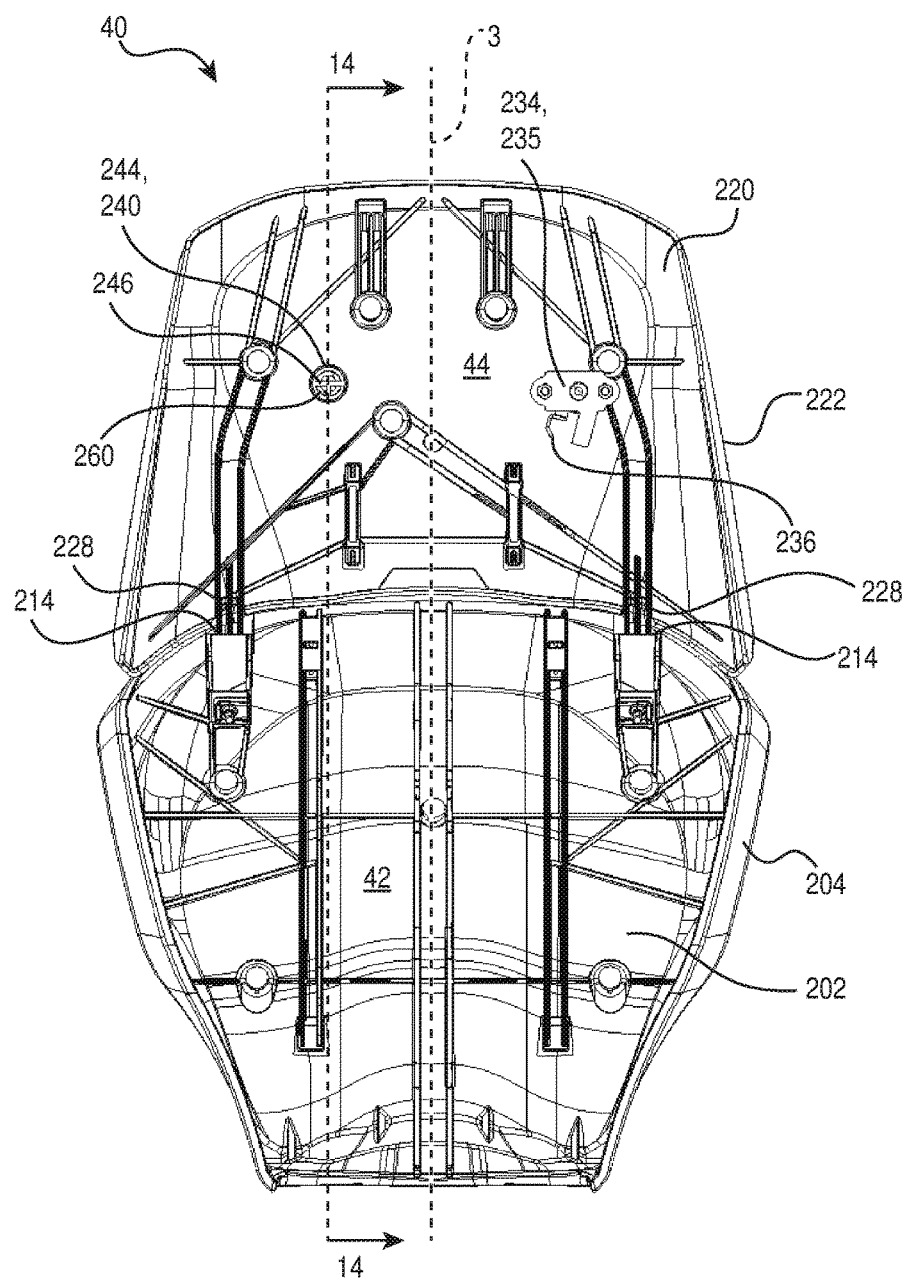
FIG. 4 is a bottom plan view of the seat assembly of FIG. 3.
Figure 5:
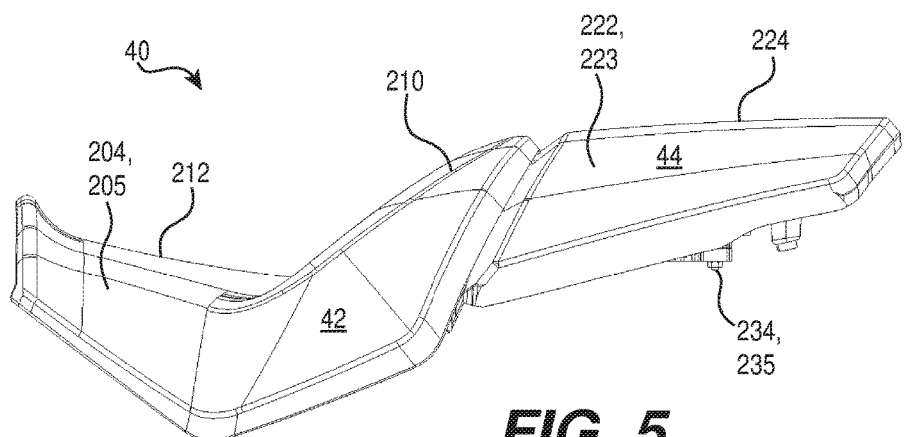
FIG. 5 is a left side elevation view of the seat assembly of FIG. 3.
Figure 6:
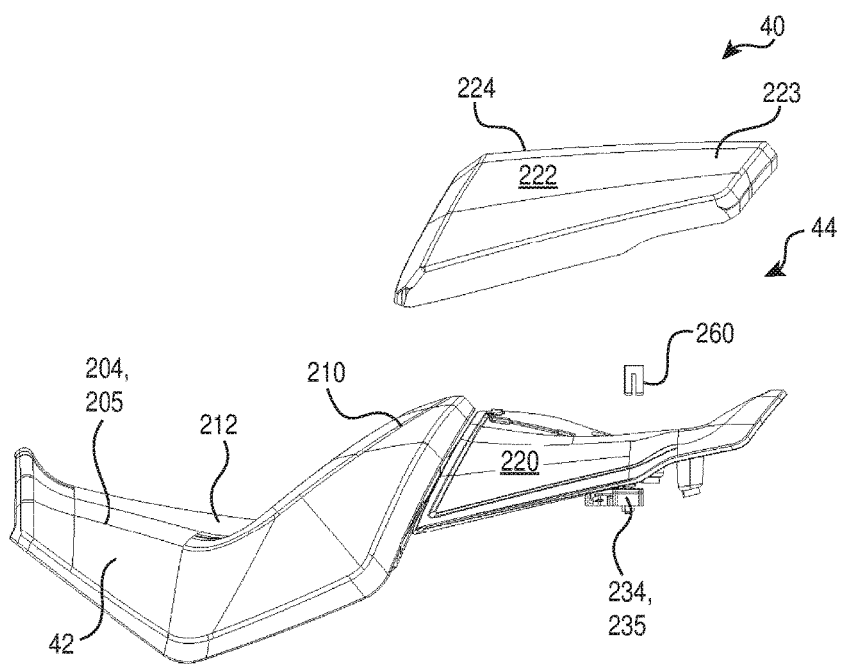
FIG. 6 is a partially exploded left side elevation view of the seat assembly of FIG. 3.
Figure 12:
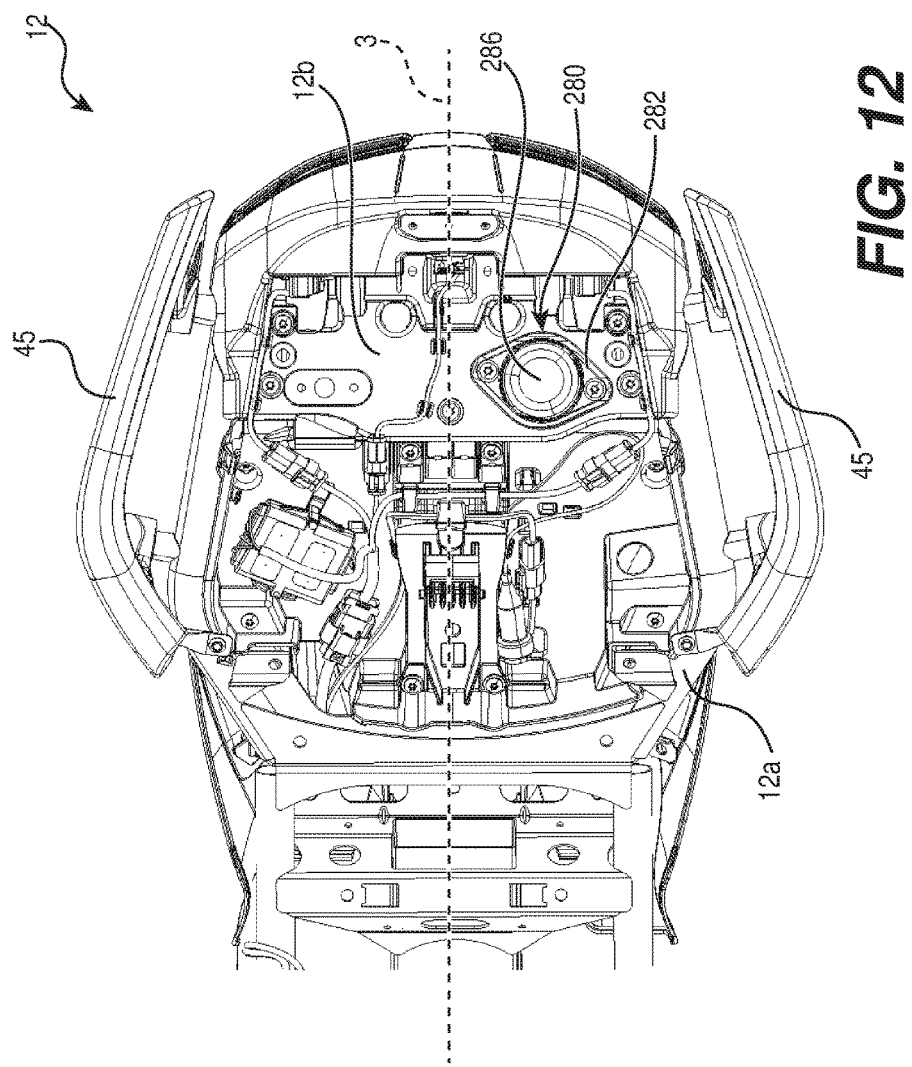
FIG. 12 is a top plan view of a rear portion of the portion of the frame and the handles of FIG. 11.

With reference to FIG. 1, a vehicle 10 has a front end 2 and a rear end 4 defined consistently with the forward travel direction of the vehicle 10. The vehicle 10 has a frame 12 which defines a longitudinal centerplane 3 (FIGS. 3, 4 and 12).

The vehicle 10 is a three-wheel vehicle 10 including a left front wheel 14, a right front wheel 14 and a single rear wheel 16. It is however contemplated. that the vehicle 10 could have more than one rear wheel 16. Each front wheel 14 is connected to the frame 12 by a front suspension assembly (not shown). The rear wheel 16 is connected to the frame 12 by a rear suspension assembly 30 which includes a swing arm 32 and a shock absorber 34. The left and right front wheels 14 and the rear wheel 16 each have a tire secured thereto. The front wheels 14 are equally offset from the longitudinal centerplane 3 in the lateral direction, and the rear wheel 16 is centered with the longitudinal centerplane 3.

Figure 2:
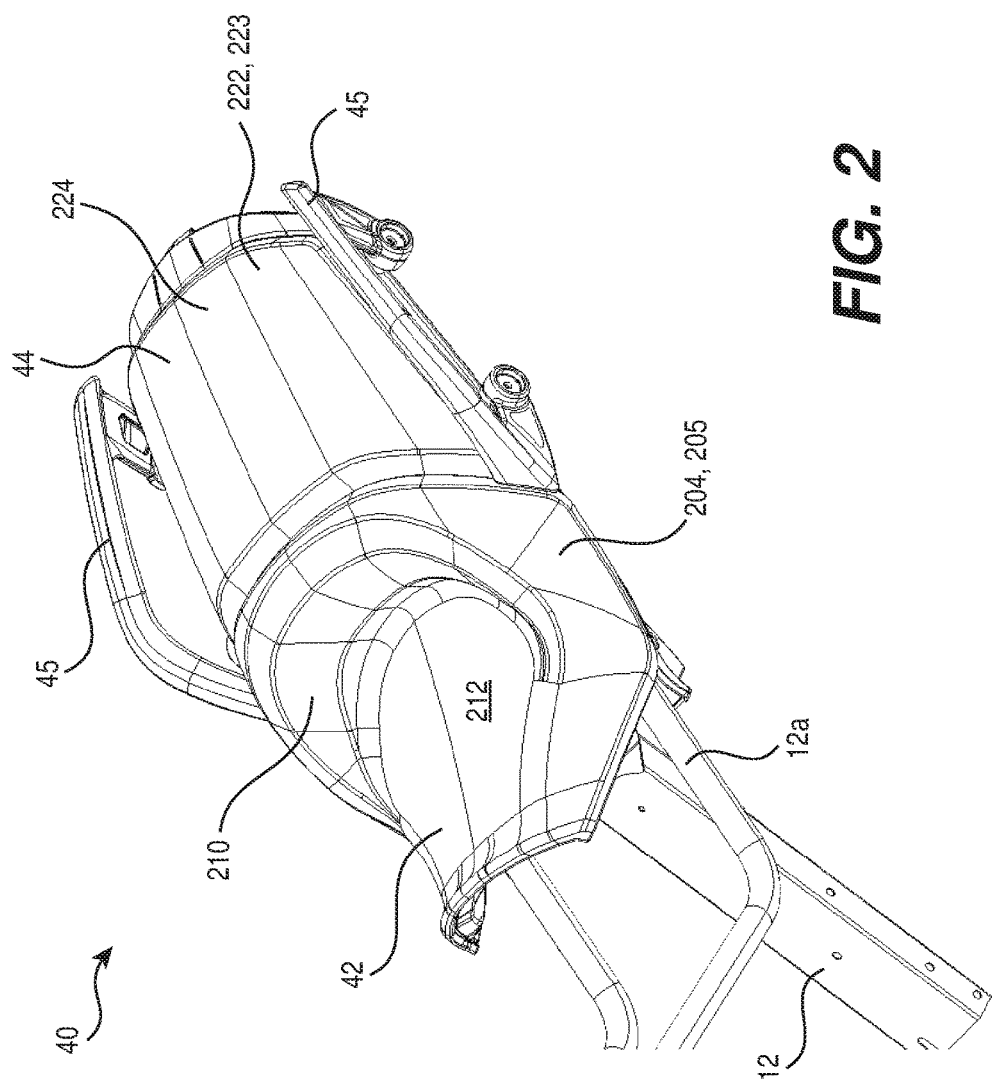
FIG. 2 is a perspective view, taken from a top, front and left side, of the seat assembly and a portion of the frame of the vehicle of FIG. 1.
Figure 11:
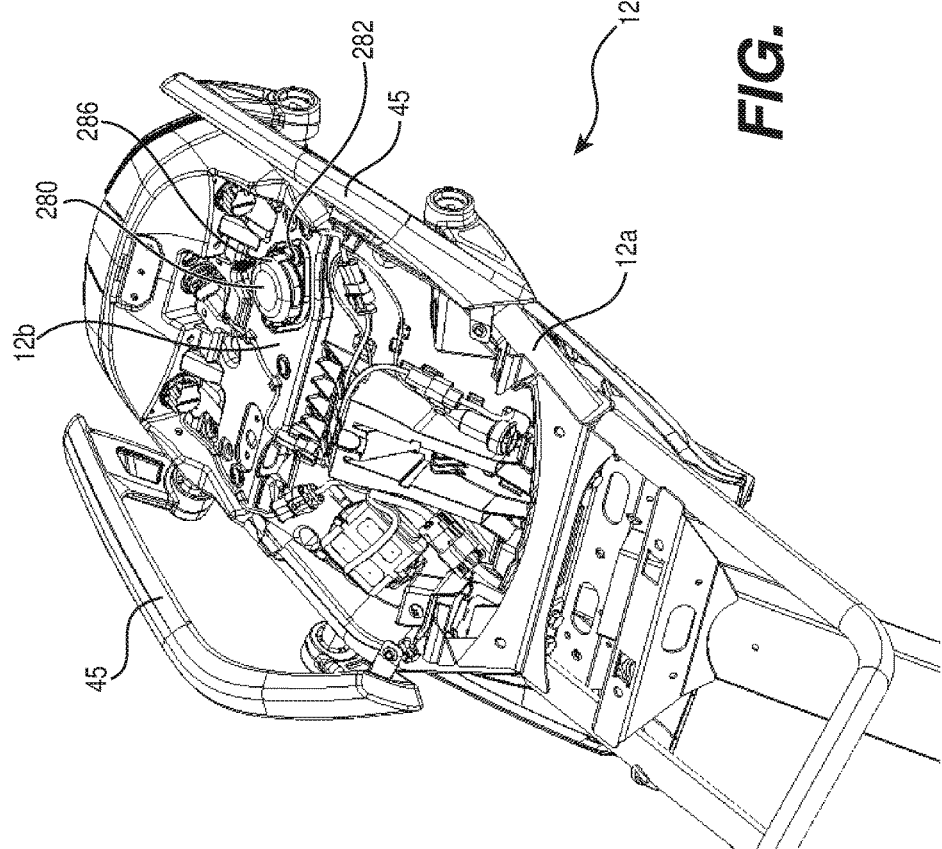
FIG. 11 is a perspective view, taken from a top, front and left side, of the portion of the frame and the handles of the seat assembly of FIG. 2.

The vehicle 10 has a straddle seat assembly 40 disposed along the longitudinal centerplane 3 and supported by the frame 12. The straddle seat 40, which is adapted to accommodate two adult-sized riders, includes a forward seat portion 42 for the driver and a rearward seat portion 44 for a passenger. The rearward seat portion 44 is higher than the forward seat portion 42. The forward seat portion 42 is referred to hereinafter as the driver seat 42, and the rearward seat portion 44 is referred to hereinafter as the passenger seat 44. The seat 40 will be described below in further detail. A right handle 45 extends longitudinally on the right side of the passenger seat 44 and a left handle 45 (FIGS. 11 and 12) extends longitudinally along a left side of the passenger seat 44. A passenger seated on the passenger seat 44 can hold on to the pair of handles 45 for support. As best seen in FIGS. 2 and 11, the portion of the frame 12 on which the seat assembly 40 is mounted includes a U-shaped tubular member 12a having two arms and a tray 12b extending across the two arms of the U-shaped member 12a. Each of the left and right handles 45 is connected to the respective arm of the U-shaped member 12a. It is contemplated that the handles 45 could be omitted or configured differently than as shown, A driver footrest 46 is disposed on either side of the vehicle 10 and vertically lower than the driver seat 42 to support the feet of a driver seated on the driver seat 42. The right driver footrest 46 is mounted on a right rail 47 connected to the frame 12 and disposed on a right side of the longitudinal centerplane 3. Although not shown, the left driver footrest 46 is similarly mounted on a left rail 47 connected to the frame 12 and disposed on a left side of the longitudinal centerplane 3. Each side of the vehicle 10 also has a passenger footrest 48 disposed rearward of the corresponding driver footrest 46 to support the feet of the passenger seated on the passenger seat 44, The passenger footrests 48 are fixed to the frame 12. In the illustrated implementation, the footrests 46, 48 are in the form of foot pegs. It is however contemplated that the footrests 46, 48 could be in the form of footboards.

A steering assembly 50 is disposed forwardly of the straddle seat 40 to allow a driver to steer the two front wheels 14. The steering assembly 50 includes a handlebar 52 connected to a steering column 54. The steering column 54 is connected to the front wheels 14 via steering linkages (not shown) such that turning the handlebar 52 turns the steering column 54 which, through the steering linkages, turns the wheels 14. In the illustrated implementation of the vehicle 10, the steering assembly 50 includes a power steering unit (not shown) to facilitate steering of the vehicle 10. It is contemplated that the power steering unit could be omitted.

The frame 12 supports a motor 60 (shower schematically in 1). In the illustrated implementation of the vehicle 10, the motor 60 is an internal combustion engine but it is contemplated that the motor 60 could be other than an internal combustion engine. For example, the motor 60 could be an electric motor, a hybrid, or the like. The engine 60 is located longitudinally rearward of the front wheels 14. The engine 6( )is an inline three-cylinder four-stroke internal combustion engine, but it is contemplated that other types of engines could he used such as a two- stroke internal combustion engine, and the like. The engine 60 is operatively connected to the rear wheel 16 to drive the rear wheel 16. It is contemplated that the engine 60 could be connected to the front wheels 14 in addition to the rear wheel 16. A control unit 62 is connected to the engine 60 for controlling operation of the engine 60 and other vehicle systems.

Each of the two front wheels 14 and the rear wheel 16 is provided with a brake 82. The brakes 82 of the three wheels 14, 16 form a brake assembly 80. Each brake 82 is a disc-type brake mounted onto a hub of its respective wheel 14 or 16. Other types of brakes are contemplated. Each brake 82 includes a rotor 84 mounted onto the wheel hub and a stationary caliper 86 straddling the rotor 84. The brake pads (not shown) are mounted to the caliper 86 so as to be disposed between the rotor 84 and the caliper 86 on either side of the rotor 84. A brake actuator, in the form of a foot-operated brake lever 88, is connected to the right driver footrest 46 for braking the vehicle 10. The foot brake lever 88 is operatively connected to the brakes 82 provided on each of the two front wheels 14 and the rear wheel 16. It is contemplated that the foot brake lever 88 could be operatively connected only to the brakes 82 of the front wheels 14, or only to the brake 82 of the rear wheel 16. It is contemplated that the foot brake lever 88 could be omitted and that the vehicle 10 could be provided with a hand-operated brake actuator connected to the handlebar 52 instead. It is contemplated that the brake assembly 80 could be connected to a hand-operated brake actuator mounted to the handlebar 52 in addition to the foot brake lever mounted to the right footrest 46.

The vehicle 10 includes body panels 90 connected to the frame 12 to enclose and protect the internal components of the vehicle 10 such as the engine 60. The body panels 90 include a hood 92 disposed at the front of the vehicle 10 between the front wheels 14. The hood 92 is pivotably connected to the frame 12 and can be disposed in an open position to provide access to a storage bin 94 disposed under the hood 92. The body panels 90 also include a rear deflector 96, or fender 96, disposed over the rear wheel 16 to protect the driver and/or passenger from dirt and water which can be lifted by the wheel 16 while it is rolling. It is contemplated that additional fenders covering the front wheels 14 could be provided.

Figure 7:
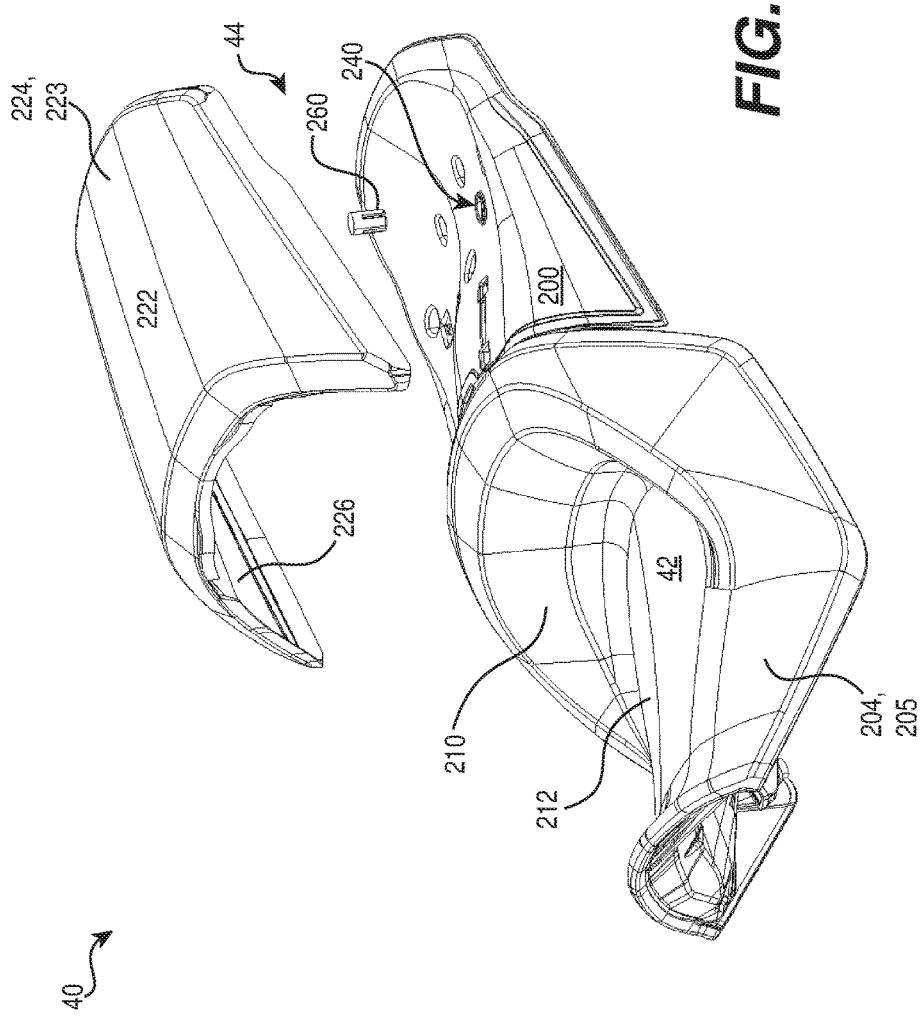
FIG. 7 is a partially exploded perspective view, taken from a top, front and left side, of the seat assembly of FIG. 3.

The seat assembly 40 will now be described in further detail with reference to FIGS. 2 to 15C. The seat assembly 40 includes the driver seat 42 and the passenger seat 44 mentioned above and a passenger presence responsive member (PPRM) 260 (FIG. 7) that is responsive to the weight of a passenger seated on the passenger seat 44.

With reference to FIGS. 2 to 7, the driver seat 42 has a driver seat base 202 (FIG. 4) and a driver seat cushion 204, The driver seat base 202 is rigid and made of plastic. The driver seat base 202 is disposed on the frame 12 and removably connected thereto. The driver seat cushion 204 is made of molded foam. The driver seat cushion 204 is shaped to have a raised portion 210 at its rear end that provides support to the lower back and hips of a driver seated on the driver seat cushion 204. The driver seat cushion 204 has an upper surface 212 and a lower surface (not shown) that is disposed on the driver seat base 202. The driver seat cushion 204 is covered with a driver seat cover 205 to protect the driver seat cushion 204 from the elements. The driver seat cushion 204 is removably connected to the driver seat base 202 to enable replacement of the driver seat cushion 204 if desired and access the space therebeneath. It is contemplated that the driver seat base 202 and/or the driver seat cushion 204 could be configured differently than as shown herein. It is contemplated that the driver seat base 202 could be made of any suitable material other than plastic, and that the driver seat cushion 204 could be made of any suitable material other than foam.

The passenger seat 44 is a removable passenger seat which can be selectively disposed on the frame 12 or removed from the vehicle 10 as desired, The passenger seat 44 has a passenger seat base 220 (FIG. 4) and a passenger seat cushion 222. The passenger seat base 220 is rigid and made of plastic. In the illustrated implementation of the vehicle 10, the passenger seat base 220 is formed separately from the driver seat base 202 and removably connected thereto. The front edge of the passenger seat base 220 is connected to the rear edge of the driver seat base 202 by a pair of tabs 228 extending forwardly from the front edge of the passenger seat base 220 which are received in corresponding slots 214 formed along the rear end of the driver seat base 202 as can he seen in FIG. 4. It is also contemplated that the passenger seat base 220 could be formed integrally with the driver seat base 202. The passenger seat base 222 is removably fastened to the frame 12 by a latch mechanism 234 (FIG. 4). The latch mechanism includes a housing 235 which is bolted to the frame 12 below the passenger seat 44 on a right side of the longitudinal centerplane 3. A pin (not shown) projecting downwardly from the lower surface of the passenger seat base 220 is received and engaged by a latch member (not shown) disposed inside the housing 235. In order to install the passenger seat 44 on the vehicle 10, the front end of passenger seat 44 is moved forward towards the rear end of the driver seat 42 so as to insert the passenger seat base tabs 228 in the corresponding driver seat base slots 214. The rear portion of the passenger seat 44 is then lowered toward the frame 12 so that the pin projecting downward from the passenger seat base 220 is received and engaged by the latch mechanism 234. A hook 236 disposed outside the housing 235 is connected to the latch member disposed inside the housing 235. In order to disconnect the passenger seat 44 from the vehicle 10, the pin is disengaged from the latch member by actuating a push-pull cable (not shown) connected to the hook 236. Once the passenger seat base 220 is disengaged from the frame 12, the passenger seat 42 can be pulled rearwards away from the driver seat 42 to remove the passenger seat base tabs 228 from the corresponding driver seat base slots 214 to disconnect the passenger seat 44 from the driver seat 42. In the illustrated implementation of the vehicle 10, the driver seat base 202 can be disconnected from the frame 12 only after disconnecting the passenger seat base 220 therefrom. It is however contemplated that the driver seat base 202 could. he disconnected from the frame 12 independently of the passenger seat base 220. It is also contemplated that the passenger seat base 220 could be made of any suitable material other than plastic. It is contemplated that the passenger seat base 220 could be configured differently than as shown herein.

The passenger seat cushion 222 is formed of molded foam and connected to the passenger seat base 220. The passenger seat cushion 222 extends on top of the passenger seat base 220 and on either side thereof. The front edge of the passenger seat cushion 222 abuts the rear edge of the driver seat cushion 204. The passenger seat cushion 222 is covered with a passenger seat cover 223 to protect the passenger seat cushion 222 from the elements. It is contemplated that the passenger seat cushion 222 could be configured differently than as shown herein. It is contemplated that the passenger seat cushion 222 could be made of any suitable material other than foam, The passenger seat cushion 222 has a lower surface 226 that is disposed on the passenger seat base 220 and an upper surface 224 that faces away from the passenger seat base 220. In the absence of a passenger being seated on the passenger seat cushion 222, the upper surface 224 extends generally horizontally in a middle portion (which is intersected by the longitudinal centerplane 3) as can be seen when viewed from a side as in FIG. 5. The middle portion of the upper surface is generally vertically aligned with the top edge of the raised portion 210 of the driver seat cushion 202 in the absence of a passenger being seated thereon. When a passenger is seated thereon, the passenger seat cushion 222 becomes compressed and the upper and lower surfaces 224, 226 of the passenger seat cushion 222 are deformed compared to their configuration in the absence of a passenger being seated thereon. Since the passenger seat base 220 is rigid and rigidly connected to the frame 12 of the vehicle 10, the passenger seat base is neither displaced nor significantly deformed when the passenger seat cushion 222 is compressed due to the presence of a passenger being seated thereon.

Figure 8:
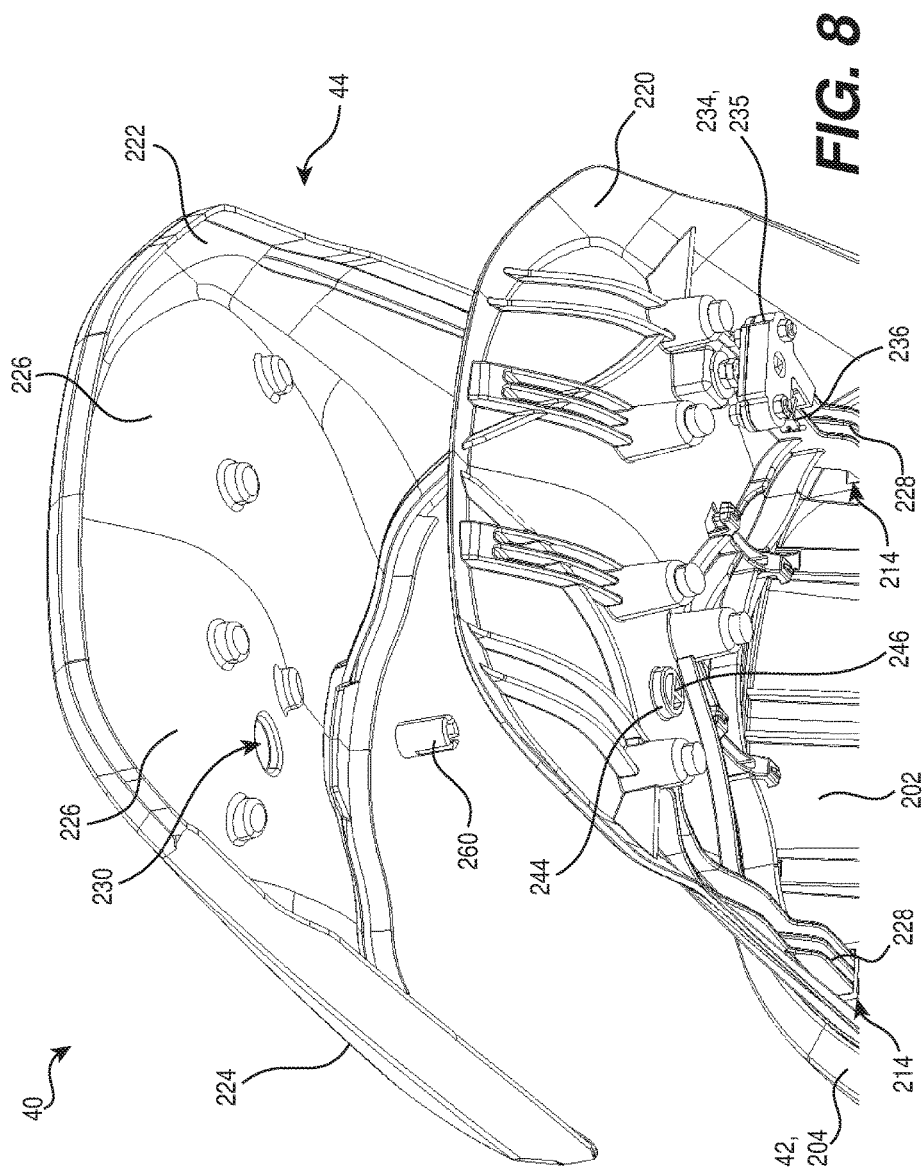
FIG. 8 is an enlarged and exploded, perspective view, taken from a bottom, rear and left side, of a portion of the passenger seat of the seat assembly of FIG. 3.
Figure 13:
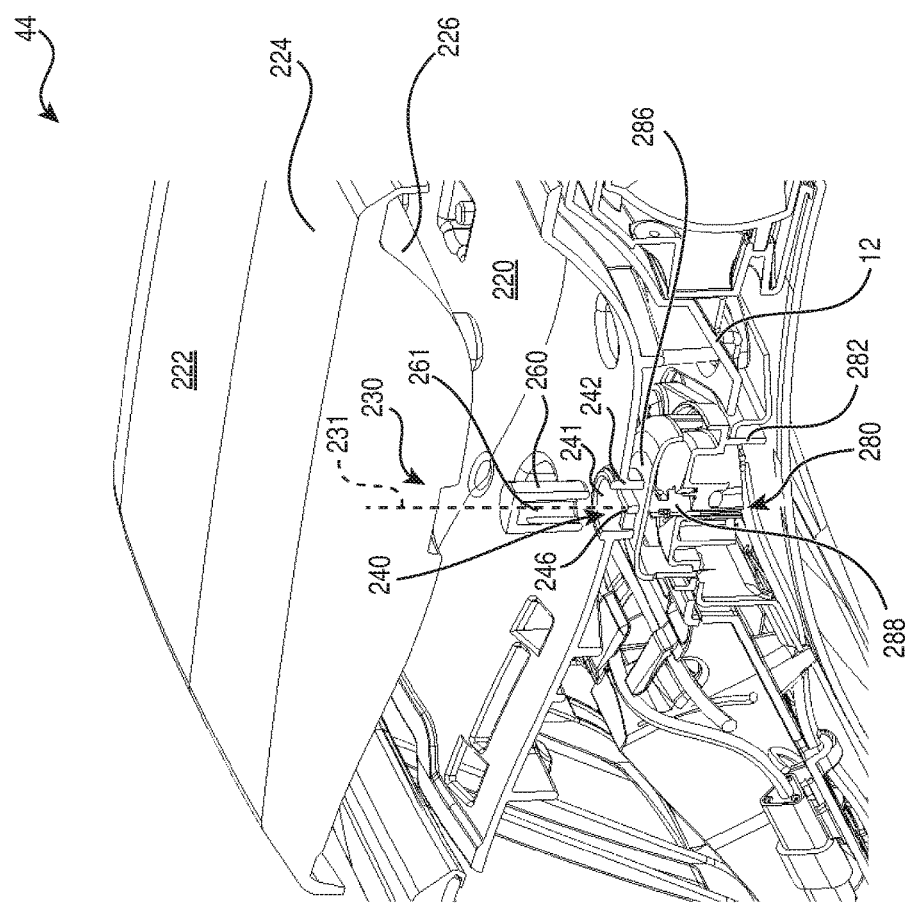
FIG. 13 is a partially exploded perspective view, taken from a top, rear and left side, of a cross-section taken along the line 13-13 of FIG. 4, of the passenger seat of the seat assembly and a portion of the frame of FIG. 2.
Figure 14:
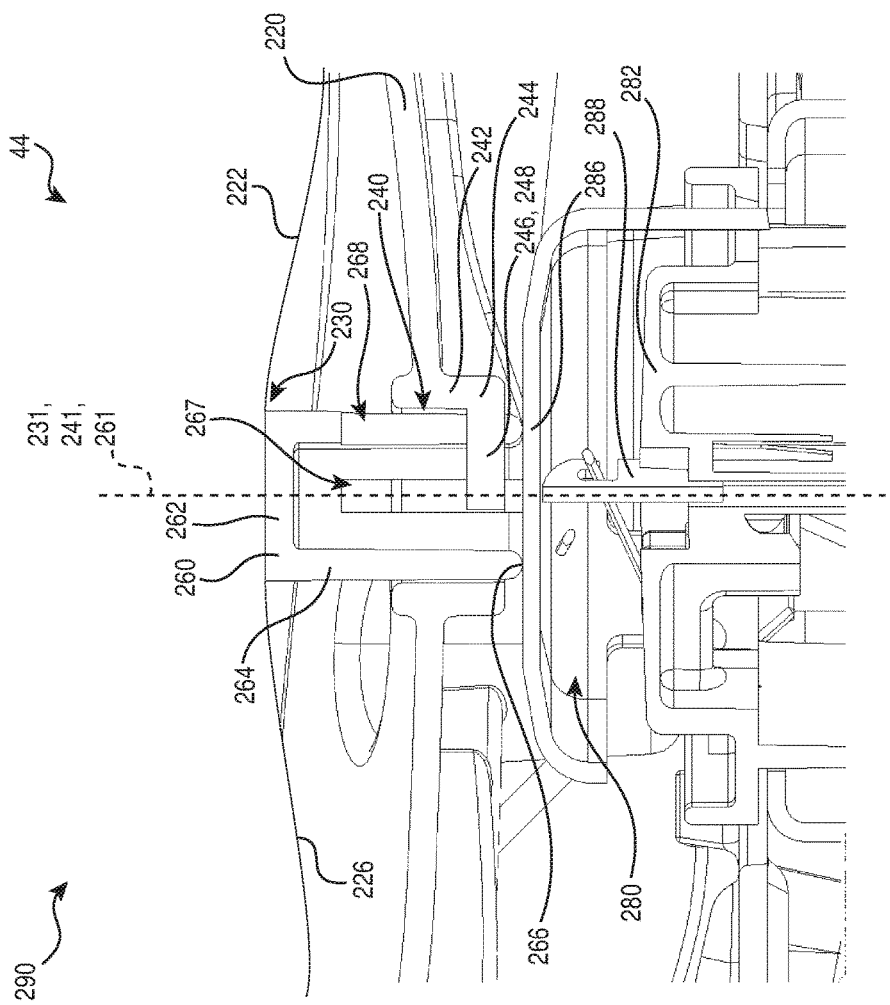
FIG. 14 is an enlarged cross-sectional view of the passenger seat and portion of the frame of FIG. 13 with the passenger seat being assembled and disposed in a passenger absent configuration in the absence of a passenger being seated thereon.

With reference to FIGS. 8, 13 and 14, the lower surface 226 of the passenger seat cushion 222 has a recess 230. The recess 230 extends upwards from the lower surface 226 towards the upper surface 224. The recess 230 is cylindrical (in the uncompressed and undeformed state of the passenger seat cushion 222) and defines a central axis 231. The recess 230 is disposed on a left side of the longitudinal centerplane 3, approximately midway between the front and rear edges of the passenger seat cushion 222.

With reference to FIGS. 4, 7 to 10B, 13 and 14, the passenger seat base 220 has an opening 240 extending therethrough and disposed below and in alignment with the recess 230 of the passenger seat cushion 222. The opening 240 is circular in shape and has a central axis 241, which is coaxial with the central axis 231 of the passenger seat cushion recess 230. A cylindrical sleeve 242 defines the opening 240 and extends downwardly from the lower surface of passenger seat base 220. A T-shaped projection 246 extends across the lower end 244 of the cylindrical sleeve 242.

The T-shaped projection 246 has a first arm 247 extending diametrically across the lower end 244 of the sleeve 242 from one side of the inner sleeve wall to the opposite side of the inner sleeve wall. A second arm 248 extends perpendicular to the first arm 247 from the center of the first arm 247 to the inner sleeve wall. It is contemplated that the sleeve 242 could be omitted and the projection 246 could be formed continuously with the passenger seat base surface disposed adjacent the opening 240. It is also contemplated that the projection 246 could have another shape.

Figure 9:
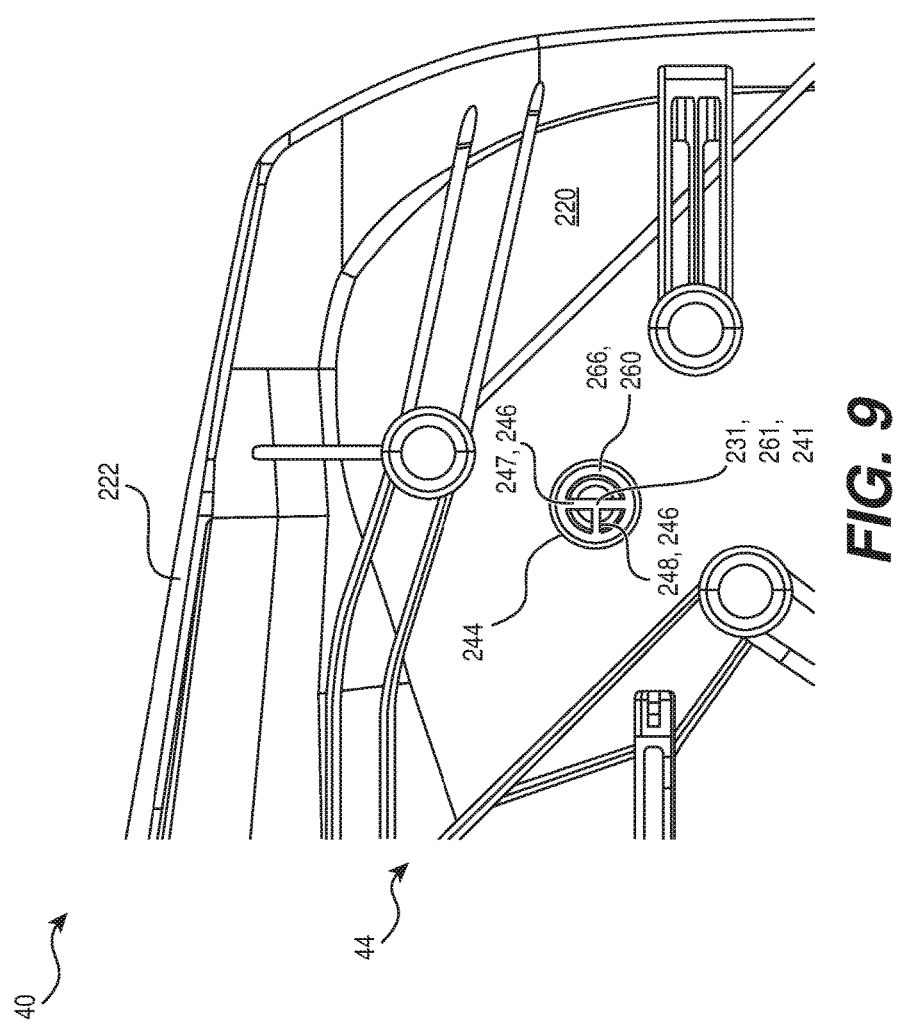
FIG. 9 is an enlarged, bottom plan view of a left portion of the passenger seat of the seat assembly of FIG. 3.
Figure 10B:
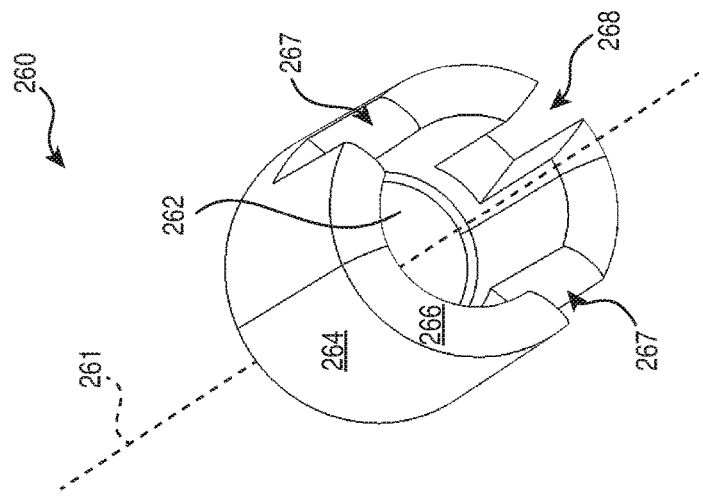
FIG. 10B is a perspective view, taken from a bottom, rear and left side, of the PPRM of FIG. 10A.
Figure 10A:
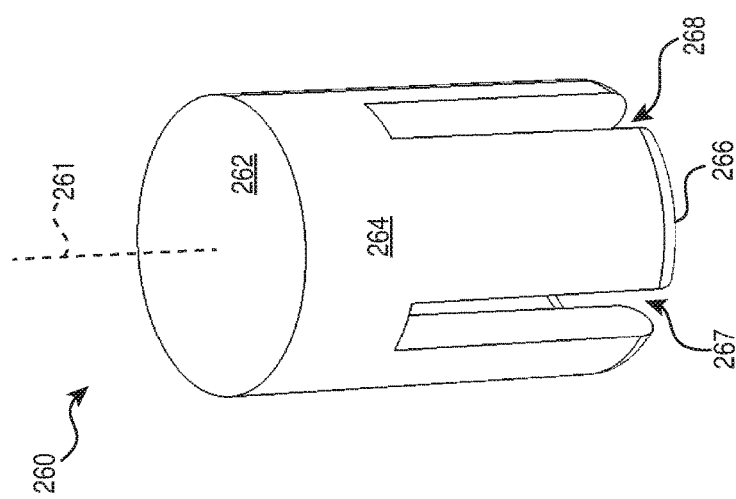
FIG. 10A is a perspective view, taken from a top, front and left side, of the passenger presence responsive member (PPRM) of the seat assembly of FIG. 7.

With reference to FIGS. 4, 9 and 14, the PPRM 260 is housed partly the cylindrical recess 230 and partly in the cylindrical sleeve 242, The upper portion of the PPRM 260 is disposed in the recess 230 in contact with the passenger seat cushion 222. A middle portion of the PPRM 260 extends through the seat base opening 240 and the cylindrical sleeve 242. A lower portion of the PPRM 260 extends below the passenger seat base 220 (FIGS. 14 to 15C). The PPRM 260 is moveable in the recess 230 and the opening 240 responsive to the weight of a passenger being seated on the passenger seat 44, With reference to FIGS. 10A, 10B and 14, the PPRM 260 is in the form of a hollow cylindrical plunger, having a central axis 261, The cylindrical PPRM 260 has a planar upper wall 262 and a cylindrical side wall 264 having a lower edge 266 disposed opposite the upper wall 262. The upper wall 262 is disposed in the recess 230 and abuts the passenger seat cushion 222. Two rectangular slots 267 defined in the side wall 264 are disposed diametrically across from each other. Each of the slots 267 extends from the lower edge 266 towards the upper wall 252 and receives a corresponding end of the T-shaped. projection arm 247. Another rectangular slot 268 defined in the side wall 264 is circumferentially centered between the slots 257 so as to receive the end of the T-shaped projection arm 248. The projection 246 retains the PPRM 260 between the passenger seat base 220 and the passenger seat cushion 222, preventing the PPRM 260 from falling out of the passenger seat 44 via the seat base opening 240 when the passenger seat base 220 is removed from the vehicle frame 12. The projection 246 of the passenger seat base 220 also engages the PPRM 260 so as to prevent rotation of the PPRM 260 with respect to the passenger seat base 220.

The lower edge 266 of the PPRM 260 is disposed on a passenger presence sensor 280 (FIGS. 11 and 12) which is mounted to the frame 12 below the seat cushion recess 230 and the seat base opening 240. The passenger presence sensor 280 is spaced from the passenger seat base 220 which extends thereabove. The passenger presence sensor 280 is actuated by the PPRM 260 extending through the seat base opening 240 as will be described below in further detail and thereby configured to detect the position of the PPRM 260. The passenger presence sensor 280 is communicatively coupled to the control unit 62 to send signals indicative of the position of the PPRM 260.

With reference to FIGS. 11 to 15C, in the illustrated implementation of the vehicle 10, the passenger presence sensor 280 is a Hall effect switch provided by Delta Systems Inc. (part no. 6540-003 7AL). The passenger presence sensor 280 includes a sensor base 282. which houses a Hall-effect sensing member indicated), As can be seen in FIGS. 11 and 12, the sensor base 282 is rigidly mounted to the portion of the frame 12 supporting the seat assembly 40. The sensor base 282 is mounted to the upper surface of the tray 12b. A plate 286 extends across the top of the sensor base 282. The lower edge 266 of the PPRM 260 is disposed on the upper surface of the plate 286. A member 288 is disposed under the plate 286 so as to move with the plate 286. The plate 286 and the member 288 are mounted so as to be moveable towards and away from the sensor base 282. A spring (not shown) biases the plate 286 and the member 288 away from the sensor base 282. A downward force on the plate 286 displaces the plate 286 and the member 288 towards the passenger seat base 282. The position of the member 288 determines the magnetic field sensed by the Hall effect sensor 284 and the output voltage of the Hall effect sensor 280.

In the illustrated implementation of the vehicle 10, the Hall effect sensor 280 outputs a voltage of zero when the moveable plate 286 and member 288 are disposed in their unbiased position. The passenger seat cushion 222 is installed on the passenger seat base 220 such that the passenger seat cushion 222 exerts a force on the Hall effect sensor 280 even in the absence of a passenger seated on the passenger seat 44. Accordingly, if the output voltage of the Hall effect sensor 280 is zero, then the PPRM 260 is not in contact with plate 286 due, for example, to an incorrect or improper installation of the passenger seat 44 or damage to the seat assembly 40.

The output voltage of the passenger presence sensor 280 increases irs magnitude when the plate 286 and the member 288 are pushed further downward towards the sensor base 282 from their unbiased positions. When the PPRM 260 is displaced downward due to a downward. force being exerted thereon, the PPRM 260 exerts a corresponding downward force on the plate 286 displacing the plate :286 and the member 288 downwards towards the sensor base 282, thereby changing the output voltage of the passenger presence sensor 280. The output voltage of the passenger presence sensor 280 is thus indicative of the position of the PPRM 260, and of the force being exerted by the PPRM 260 on the moveable plate 286. The output voltage of the PPRM 260 is also indicative of the absence or presence of a passenger being seated on the passenger seat 44 since the position of the PPRM 260 changes responsive to the weight of a passenger seated on the passenger seat cushion 222. A passenger seated on the passenger seat cushion 222 exerts a downward force on the passenger seat cushion 222, compressing the passenger seat cushion 222 and displacing the PPRM 260, the moveable plate 286 and member 288 downwards towards the sensor base 282.

The output voltage of the hall-effect sensor 284 is sent as a signal to the control unit 62 which controls operation of the engine 60 and other components of the vehicle 10 such as brakes, the throttle valve and the like, based on the signals received from the passenger presence sensor 280. It is contemplated that the control unit 62 controls operation of the vehicle 10 such that a vehicle operation (engine rotation speed, for example) is changed responsive to a change in the output voltage signal received from the passenger seat sensor 280 only if the new voltage signal is received for a minimum predetermined amount of time. It is contemplated that the predetermined amount of time could be different for different vehicle operations. The operation of the vehicle 10 based on signals received from the passenger presence sensor 280 will not be discussed herein. Further details of the operation of the vehicle 10 based on signals received from the passenger presence sensor 280 can be found in U.S. Pat. No. 8,260,535, issued on Sep. 4, 2012, the entirety of which is incorporated herein by reference.

In the illustrated implementation of the vehicle 10, the passenger presence sensor 280 is mounted to the frame 12 on a left side of the longitudinal centerplane 3. The passenger presence sensor 280 is disposed in a position such that the right sitting (ischial) bone of the passenger compresses the passenger seat cushion 222 just above the passenger presence sensor 280. The alignment with a sitting bone with the passenger presence sensor 280 ensures an effective transfer of weight from the passenger to the passenger presence sensor 280. In the illustrated implementation of the vehicle 10, the latch mechanism 234 is mounted to the frame 12 on a right side of the longitudinal centerplane 3 so that the weight of the passenger transferred via the right sitting bone of the passenger ensures effective engagement of the passenger seat base pin in the latch mechanism, hereby ensuring that the passenger seat base is properly fastened to the frame 12. It is contemplated that the passenger presence sensor 280 could be mounted to the frame 12 on a right side of the longitudinal centerplane 3 so as to receive weight transferred via the right sitting bone of the passenger instead of the left sitting hone and the latch mechanism 234 accordingly be moved to the left side of the longitudinal centerplane 3. It is also contemplated that the passenger presence sensor 280 and/or the latch mechanism 234 could be mounted to the frame 12 in another location than as shown herein. For example, the passenger presence sensor 280 could as well as the latch mechanism could be mounted on the frame 12 along the longitudinal centerplane 3.

Figure 15A:
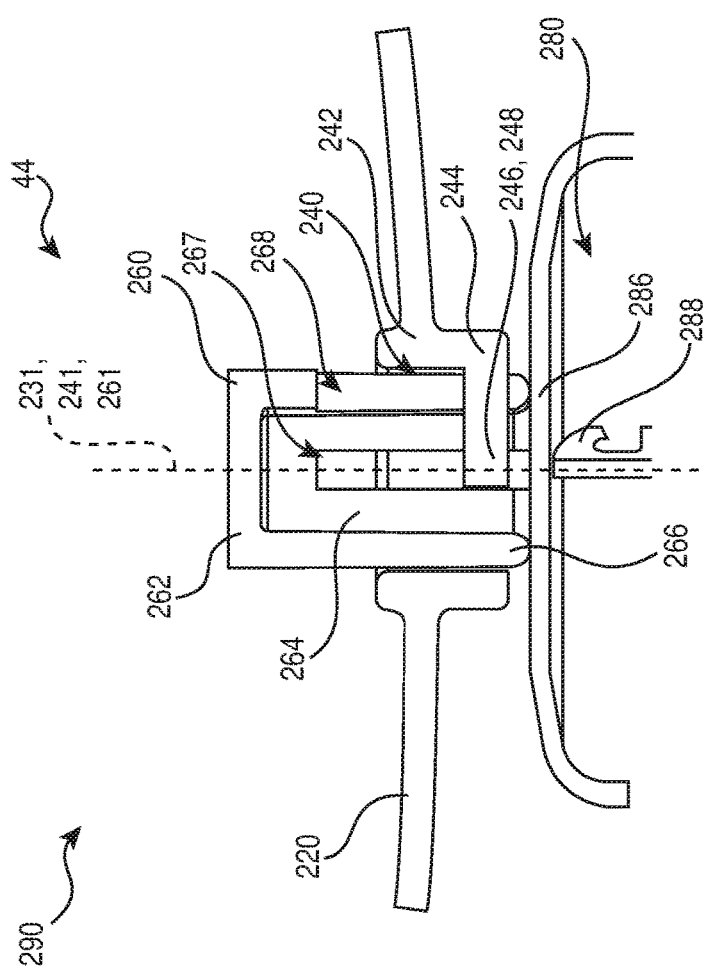
FIG. 15A is an enlarged cross-sectional view of the passenger seat and portion of the frame of FIG. 13 with the seat cushion being removed for clarity.

FIG. 15A shows the passenger seat 44 in a passenger absent configuration such as in the absence of a passenger being seated thereon. When the passenger seat cushion 222 is installed correctly on the passenger seat base 220, and the passenger seat base 220 is installed correctly on the frame 12, and in the absence of a passenger being seated on the passenger seat cushion 222, the PPRM 260 is disposed in a passenger absent position 290. The passenger absent position 290 of the PPRM 260 corresponds to a biased position of the moveable plate 286 in which the moveable plate 286 and member 288 are pushed closer towards the sensor base 282 than in their respective unbiased positions, and the output voltage of the passenger presence sensor 280 is non-zero.

Figure 15B:
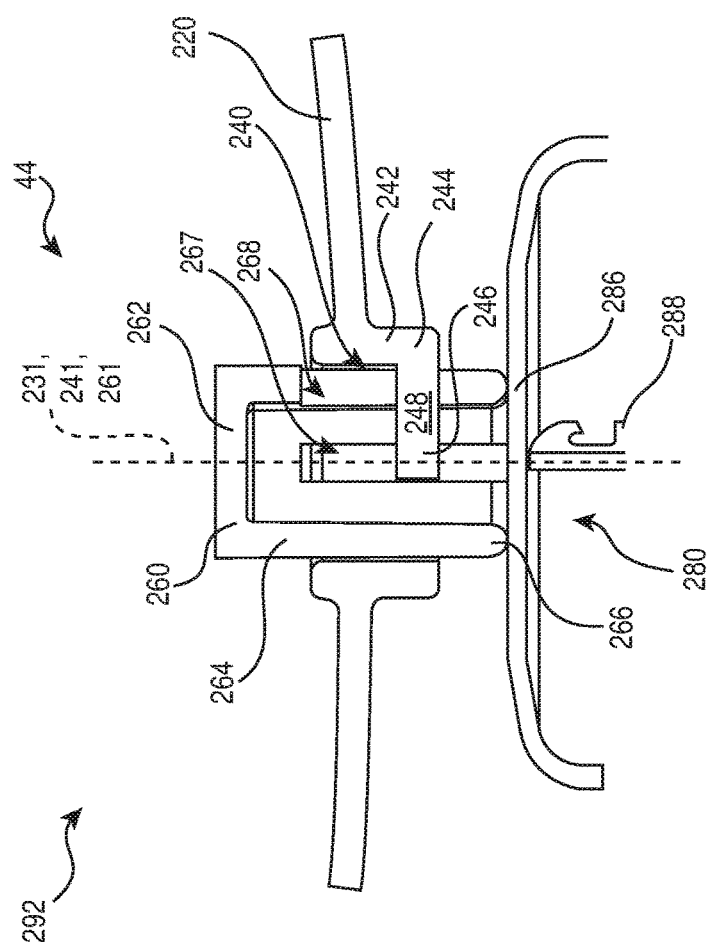
FIG. 15B is an enlarged cross-sectional view of the passenger seat and portion of the frame of FIG. 15A, with the passenger seat being shown disposed in a passenger present configuration as in the presence of a passenger being seated thereon.

FIG. 15B shows the passenger seat 44 in a passenger present configuration such as in the presence of a passenger seated thereon. When the passenger seat cushion 222 is installed correctly on the passenger seat base 220, and the passenger seat base 220 is installed correctly on the frame 12, and in the presence of a passenger being seated on the passenger seat cushion 222, the PPRM 260 is disposed in a second position 292, or a passenger present position 292. The passenger present position 292 of the PPRM 260 corresponds to a biased position of the moveable plate 286 in which the moveable plate 286 and member 288 are displaced closer towards the sensor base 282 than in the passenger absent position 290, and the output voltage of the Hall-effect sensor 280 has a magnitude greater than the output voltage when the PPRM 260 is in the passenger absent position 290. The downward displacement of the PPRM 260 with respect to the seat base 220 increases with increasing passenger weight, As can be seen in FIG. 15B, in the passenger present position 292 of the PPRM 260, the projection 246 is closer to the PPRM upper wall 262 than in the passenger absent position 290 of FIG. 15A.

The position 294 of the PPRM 260 shown in FIG. 15C corresponds to a passenger weight greater than the passenger weight corresponding to the shown in FIG. 15B. In this implementation of the vehicle 10, the position 294 of the PPRM 260 in the configuration of the passenger seat 44 shown in FIG. 15C is considered to he indicative of a passenger seat inoperative condition. As an example, the passenger seat inoperative condition position 294 could be indicative of the passenger seat cushion 222 being deformed by a force that corresponds to a passenger weight that results in the weight limitations of the vehicle 10 being exceeded. In the illustrated implementation of the vehicle 10, in the passenger seat inoperative condition position of the PPRM 260, the upper surface of the PPRM 260 is almost aligned (in the direction parallel to the axis 261) with the upper surface of the passenger seat base 220 surrounding the opening 240, and the projection 246 is closer to the PPRM upper wall 262 than in the passenger present position 292 of FIG. 15B. In the illustrated implementation, the projection 246 is almost in contact with the lower surface of the PPRM upper wall 262. In this passenger seat inoperative condition position 294 of the PPRM 260, the member 288 is closer to the sensor base 282 than in the positions 290, 292 thereof. In this configuration indicative of a passenger seat inoperative condition, the output voltage of the passenger presence sensor 280 has a magnitude greater than the output voltage in the positions 290, 292. It is contemplated that the passenger seat inoperative condition position 294 of the PPRM could be disposed at a different position than that shown herein. It is contemplated that a different type of passenger presence sensor 280 could be used, such as one whose output voltage decreases in magnitude as the plate 286 and the member 288 are pushed downward towards the sensor base 282.

In the illustrated implementation of the vehicle 10, the control unit 62 is configured to detect a plurality of different passenger present positions 292 of the PPRM 260 between the passenger absent position 290 and the passenger seat inoperative condition position 294 based on the output voltage of the passenger presence sensor 280. Each of the different passenger present positions 292 of the PPRM 260 is indicative of a different passenger weight. It is contemplated that each of the different passenger present positions 292 could also be indicative of a different position or configuration of the passenger seated on the passenger seat 44. For example, a passenger could be seated in a different position on the passenger seat 44 when the vehicle 10 is travelling in a straight ahead direction than when the vehicle 10 is executing a turn, and as a result, the force being exerted by the passenger on the passenger seat cushion 222, and thereby on the PPRM 260, could be different when the vehicle 10 is travelling in a straight ahead direction than while executing a turn. It is contemplated that the passenger presence sensor 280 could be configured to detect only one passenger present position 292 between the passenger absent position 290 and the seat inoperative position 294.

The passenger presence sensor 280 is "pre-loaded" so as to provide a non-zero voltage output when the passenger seat is correctly installed on the vehicle 10 with the passenger seat base 220 being disposed on the frame 12. As mentioned above, the passenger seat cushion 222 is connected to the passenger seat base 220 such that even in the absence of a passenger being seated on the passenger seat 44, the passenger seat cushion 222 exerts a force on the PPRM 260 resulting in a non-zero voltage output of the passenger presence sensor 280. The amount of force being exerted by the passenger seat cushion 222, and thus the output voltage corresponding to the passenger absent position 290 of the PPRM 260 is determined by the particular shape and configuration of the passenger seat base 220 and cushion 222, and the resilience of the passenger seat cushion 222. For example, a particular desired passenger absent position voltage output can be obtained by varying one or more factors such as, but not limited to, the depth of the passenger seat cushion recess 230, the length of the cylindrical sleeve 242, the density of the foam material forming the passenger seat cushion 222, the compressibility thereof, and the like.

In the illustrated implementation of the vehicle 10, the voltage output of the passenger presence sensor 280 is also used to detect errors in the installation of the passenger seat 44 on the vehicle 10 or in the assembly of the passenger seat 44. For example, the passenger seat cushion 222 being installed incorrectly on the passenger seat base 220 could result in the PPRM 260 being positioned improperly in the sleeve 242 and. exerting a smaller force on the plate 286 of the passenger presence sensor 280 than that in the passenger absent configuration shown in FIG. 16A. If the force exerted on the plate 286 by the PPRM 260 is smaller than that corresponding to the passenger absent configuration of FIG. 16A, the moveable plate 286 would be disposed higher (further away from the base 282) than in the passenger absent position 290, and the resulting voltage output of the passenger presence sensor would be smaller in magnitude than that obtained in the passenger absent position 290 shown in FIG. 16A. Thus, in this implementation of the vehicle 10, the control unit 62 could be configured to provide an indication to the driver of the vehicle 10 of the passenger seat 44 being installed incorrectly if the voltage output of the passenger presence sensor is smaller in magnitude than that obtained in the passenger absent position 290, In the vehicle described herein, the passenger presence sensor 280 is always connected to the vehicle 10, and to the control unit 62, thereby reducing the possibility of errors resulting from an improper connection of the passenger presence sensor 280, or lack thereof. The passenger presence sensor 280 does not need to be disconnected to remove the passenger seat 44, or connected when the passenger seat 44 is installed.

In the illustrated implementation of the vehicle 10, the passenger presence sensor 280 is a Hall effect sensor that is actuated by physical contact with the PPRM 260. The passenger presence sensor 280 is thus coupled to the PPRM 260 via a physical connection. It is contemplated that the passenger presence sensor 280 could be coupled to the PPRM 260 other than by physical contact, for example, the passenger presence sensor 280 could be coupled to the PPRM 260 electrically, magnetically, optically, and the like. It is contemplated that the passenger presence sensor 280 could be a sensor other than a Hall effect sensor. The passenger presence sensor 280 could be an optical sensor, a magnetic sensor other than a hall-effect type sensor, an electrical sensor, or the like.

Modifications and improvements to the above-described implementations of the present technology may become apparent to those skilled in the art. The foregoing description is intended to be exemplary rather than limiting. The scope of the present technology is therefore intended to he limited solely by the scope of the appended claims.

What is claimed is:

1. A vehicle comprising:
    a frame;
    a passenger presence sensor mounted to the frame;
    a seat assembly being removably connected to the frame and comprising:
        a driver seat disposed on the frame;
        a passenger seat disposed on the frame rearward of the driver seat, at least the passenger seat being selectively disposed on the frame; and
        a rigid passenger presence responsive member (PPRM) being etained irn the passenger seat and movable with respect to the frame between at least a first position and a second. position responsive to a weight of a passenger seated on the passenger seat, the PPRM being coupled to the passenger presence sensor in at least one of the first and second positions, the passenger presence sensor being thereby configured to detect a presence of the passenger.

2. The vehicle of claim 1, wherein the PPRM is coupled to the passenger position sensor the first position and the second position.

3. The vehicle of claim wherein the passenger sensor is disposed on the frame below the passenger seat.

4. The vehicle of claim 1, wherein the vehicle further comprises a control unit communicatively coupled to the passenger presence sensor and configured to receive a signal therefrom indicative of a position of the PPRM, the control unit being configured to control an operation of the vehicle based on the signal.

5. The vehicle of claim 1, wherein the passenger seat comprises:
    a passenger seat base being rigid and removably connected to the frame;
    a passenger seat cushion connected to the passenger seat base and disposed thereabove when the passenger seat is disposed on the frame, the passenger seat cushion being resiliently mpressible responsive to the weight of the passenger seated thereon; and
    the PPRM, the PPRM being movable responsive to the compression of the passenger seat cushion.

6. The vehicle of claim 5 wherein the passenger seat cushion comprises:
    an upper surface;
    a lower surface disposed opposite the upper surface and facing the seat base; and
    a recess extending from the lower surface towards the upper surface, the PPRM being disposed at least partly in the recess.

7. The vehicle of claim 5, wherein the passenger seat base comprises a passenger seat base opening extending therethrough, the passenger seat base opening being aligned with the passenger presence sensor and the PPRM, at least a portion of at least one of the PPRM and the passenger presence sensor being disposed in the passenger seat base opening.

8. The vehicle of claim 7, wherein the passenger seat cushion comprises:
    an upper surface;
    a lower surface opposite the upper surface and facing the seat base; and
    a recess extending from the lower surface towards the upper surface, the recess being aligned with the seat base opening, the PPRM being disposed at least partly in the recess.

9. The vehicle of claim 7, wherein a portion of the PPRM extends through the passenger seat base opening.

10. The vehicle of claim 9, wherein the seat base further comprises:
    at least one projection extending into the opening to prevent the PPRM from moving out of the passenger seat through the passenger seat base opening, the PPRM being thereby retained in the passenger seat.

11. the vehicle of claim 10, wherein the projection engages the PPRM to prevent rotation the PPRM.

12. The vehicle of claim 11, wherein the projection is T-shaped and the PPRM comprises a T-shaped slot complementary to the projection, the projection being received in the slot to thereby engage the PPRM.

13. The vehicle of claim 12, wherein the PPRM is a cylindrical member.

14. The vehicle of claim 13, wherein the passenger presence sensor is a Hall effect sensor.

15. The vehicl of claim 14, wherein the Hall effect sensor is disposed on the frame below the passenger seat, a portion of the Hall effect sensor being in contact with the PPRM in the first and second positions and being moveable with the PPRM with respect to the frame,
    the PPRM being disposed in the first position responsive to a first force on the PPRM,
    the PPRM being disposed in the second position responsive to a second force on the PPRM,
    the Hall effect sensor thereby detecting one of the first and second positions of the PPRM and thereby detecting a corresponding one of the first and second forces on the PPRM.

16. The vehicle of claim 15, wherein the PPRM is disposed in the first position in an absence of the passenger seated on the passenger seat.

17. The vehicle of claim 16, wherein when the passenger is seated on the passenger seat, the PPRM is disposed in the second position.

18. The vehicle of claim 17, wherein:
    the second position comprising a plurality of passenger present positions, each of the plurality of passenger present positions being indicative of a corresponding passenger weight of a plurality of passenger weights, the Hall effect sensor thereby detecting the corresponding one of the plurality of passenger weights.

19. The vehicle of claim 15, wherein:
the PPRM is disposed. in the first position responsive to a first passenger weight of a plurality of passenger weights; and
the PPRM is disposed in the second position responsive to a second passenger weight of the plurality of passenger weights,
the Hall effect sensor thereby being configured to detect one of the first passenger weight and second passenger weight of the plurality of passenger weights.

20. The vehicle of claim 15, wherein the PPRM is movable to a third position responsive to a third force on the PPRM, the third position being indicative of an inoperative condition of the passenger seat.

* * * * *